L. PONDELICK.
ROLLER BEARING.
APPLICATION FILED MAY 10, 1912.
1,121,661.
Patented Dec. 22, 1914.
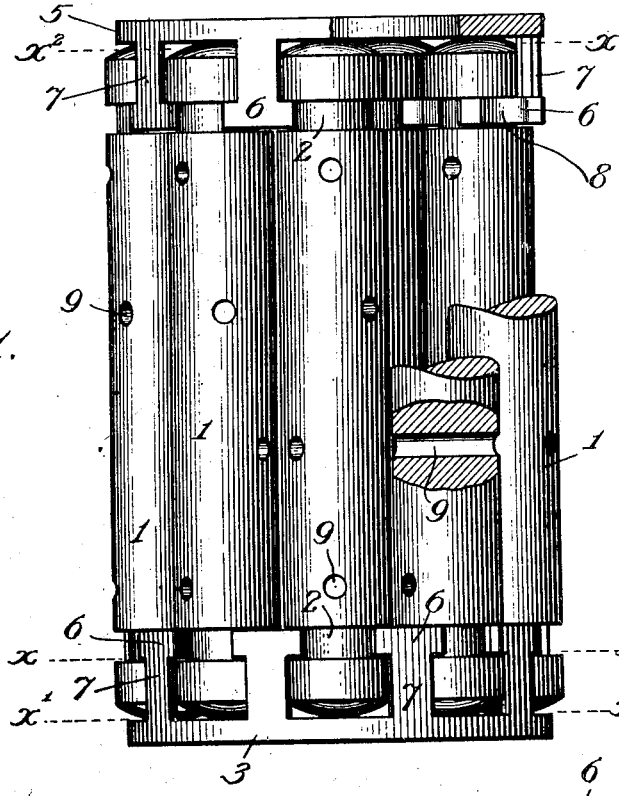
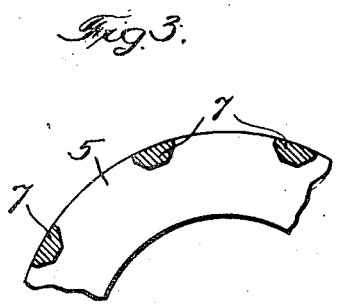
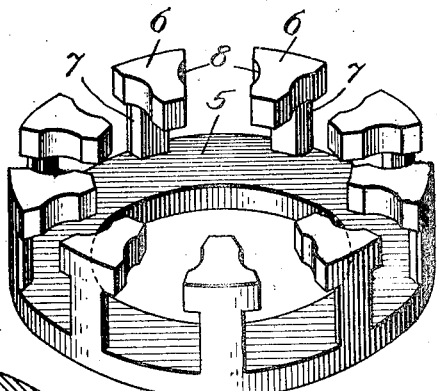
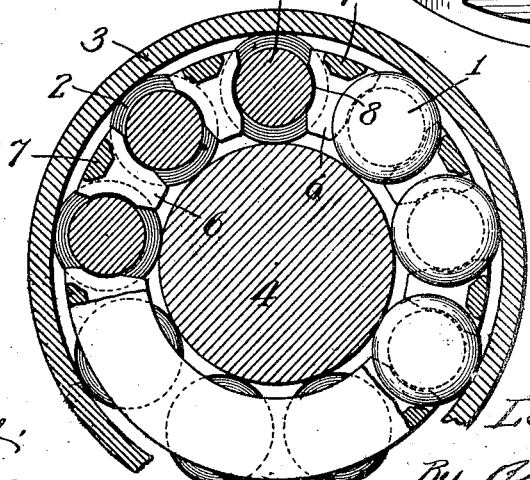
Attest:
Chas. H. Buell,
Henry Moe.
Inventor:
Leo Pondelick,
By Robert Burns
Atty.

UNITED STATES PATENT OFFICE.

LEO PONDELICK, OF CHICAGO, ILLINOIS.

ROLLER-BEARING.

1,121,661.  Specification of Letters Patent.  Patented Dec. 22, 1914.

Application filed May 10, 1912. Serial No. 696,416.

*To all whom it may concern:*

Be it known that I, LEO PONDELICK, a citizen of the United States of America, and a resident of Chicago, in the county of Cook, State of Illinois, have invented certain new and useful Improvements in Roller-Bearings, of which the following is a specification.

This invention relates more especially to that type of roller bearings in which the rollers are of a cylindrical form and are held in proper parallel relation and against endwise displacement by retaining end rings or caps. And the present improvement has for its object, to provide a simple and efficient structural formation of the end retaining rings or cages, wherein the series of bearing rollers are effectively held in assembled relation and against accidental separation, as well as maintained in their usual parallel relation and from endwise displacement, all as will hereinafter more fully appear.

In the accompanying drawings: Figure 1, is a plan view of the roller bearing detached, parts being shown broken away and in section to illustrate the details of construction of the present invention. Fig. 2, is a view, partly in end elevation, and partly in section on lines $x$—$x$ and $x'$—$x'$, Fig. 1. Fig. 3, is a detail section on line $x^2$—$x^2$, Fig. 1. Fig. 4, is a perspective view of one of the end cages, detached.

Similar reference numerals indicate like parts in the several views.

Referring to the drawings, 1 represents the circular cluster of cylindrical bearing rollers formed with the usual convex ends and with circumferential recesses 2, adjacent to said convex ends as shown.

3 is the usual outer bearing sleeve, and 4 the shaft or axle of the bearing.

5 are the flat annular or ring shaped body portions of the pair of end retaining caps of the present construction, and which are adapted to receive the end thust of the convex ends of the bearing rollers 1 and prevent undue individual longitudinal movement thereof. And as usual in the present class of bearings, the radial thickness of said annular body portion 5, is less than the diameter of the bearing rollers 1, in order that said rollers may project to the outside of the periphery, and to the inside of the bore, of said body portion to attain an unimpeded bearing of the rollers upon the outer and inner circular track-ways provided by the bearing sleeve 3 and axle 4 aforesaid.

6 are circular clusters or series of inset spacing tongues forming an integral part of the body portions 5 of the retaining caps, and corresponding in number with that of the bearing rollers 1, and alternating therewith to impose the required parallel and separated relation of said rollers. The tongues 6 are approximately triangular in form and are spaced away from the annular body portion 5, a distance equal to that from the ends of the rollers 1 to the peripheral grooves 2 of the same, and are adapted to engage in said grooves. In the present improvement said spacing tongues 6 are in parallel relation to their respective annular body portions 5, and are connected thereto by narrow peripheral bars 7 arranged longitudinally, and which are adapted to connect the outer portions of said spacing tongues to the marginal portion of the annular body portions, in a manner which permits of said tongues being bent or sprung in any required direction in the hereinafter described assembly of the roller bearing parts. In this connection a material part of the present invention comprises the formation of holding recesses 8, preferably of the concave form shown, in the opposite sides of the inset spacing tongues 6, aforesaid, so that the holding recesses 8 of any two adjacent tongues will coact to form an enlarged intermediate cavity into which is forced the reduced neck formed in a bearing roller by the peripheral recess 2, and so that the said roller will be held in assembled relation until forcibly separated. Prior to an assemblage of the pair of end cages and the series of bearing rollers, the series of spacing tongues 6 are spread apart by an outward bending of their ductile connecting necks 7 to widen the distances between the series of opposite holding recesses 8, and so that the neck formed on the bearing rollers 1 by the circumferential recesses 2, may be disposed within the aforesaid holding recesses 8. With the parts so positioned, the series of spacing tongues 6 are forced toward the central axis of the bearing to effect a narrowing in the distance between the series of opposed holding recesses 8, so the same will close upon the aforesaid necks of the bearing rollers to hold the same in proper position and prevent subsequent separation of the rollers during handling, shipment, etc., of the appliance.

9 are a series of cylindrical orifices of a length more than double their diameter extending diametrically through the solid bodies of the bearing rollers 1 and adapted to receive and hold by capillary attraction a convenient supply of lubricant. From extended practical test it has been found that the described small and diametrically extending cylindrical orifices give very effective results over chambers formed in the interior of a roller and having a series of small outlet apertures, and that the lubricant is very evenly supplied from alternate ends of the orifice in continued use.

Having thus fully described my said invention what I claim as new and desire to secure by Letters Patent, is:—

1. In a roller bearing, the combination of a series of bearing rollers provided with peripheral grooves near their ends, and a retaining cage for said rollers comprising an annular plate member against which the rollers have endwise abutment, a plurality of thin flexible bars extending laterally from the aforesaid annular member and disposed at the periphery thereof and a plurality of inwardly extending spacing tongues of an approximately triangular form carried on the free ends of the aforesaid bars and adapted to be moved inwardly into the peripheral grooves of the bearing rollers by the inward flexure of the bars aforesaid.

2. In a roller bearing, the combination of a series of bearing rollers provided with peripheral grooves near their ends, and a retaining cage for said rollers comprising an annular plate member against which the rollers have endwise abutment, a plurality of thin flexible bars extending laterally from the aforesaid annular member and disposed at the periphery thereof and a plurality of inwardly extending spacing tongues of an approximately triangular form carried on the free ends of the aforesaid bars and adapted to be moved inwardly into the peripheral grooves of the bearing rollers by the inward flexure of the bars aforesaid, the said tongues having holding recesses formed in their opposite edges.

Signed at Chicago, Illinois, this 4th day of May, 1912.

LEO PONDELICK.

Witnesses:
 ROBERT BURNS,
 HENRY MOE.